United States Patent
Lakshmanamurthy et al.

(10) Patent No.: US 7,275,145 B2
(45) Date of Patent: Sep. 25, 2007

(54) PROCESSING ELEMENT WITH NEXT AND PREVIOUS NEIGHBOR REGISTERS FOR DIRECT DATA TRANSFER

(75) Inventors: Sridhar Lakshmanamurthy, Sunnyvale, CA (US); Prashant Chandra, Sunnyvale, CA (US); Wilson Y. Liao, Belmont, CA (US); Jeen-Yuan Miin, Palo Alto, CA (US); Pun Yim, Saratoga, CA (US); Chen-Chi Kuo, Pleasanton, CA (US); Jaroslaw J. Sydir, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 387 days.

(21) Appl. No.: 10/746,564

(22) Filed: Dec. 24, 2003

(65) Prior Publication Data

US 2005/0149691 A1   Jul. 7, 2005

(51) Int. Cl.
*G06F 9/302* (2006.01)

(52) U.S. Cl. .......................................... 712/11; 712/10

(58) Field of Classification Search .................. 712/11, 712/10, 212, 215
See application file for complete search history.

(56) References Cited

U.S. PATENT DOCUMENTS

| | | | | |
|---|---|---|---|---|
| 5,630,083 A | * | 5/1997 | Carbine et al. | 712/212 |
| 6,047,366 A | * | 4/2000 | Ohara et al. | 712/14 |
| 6,381,214 B1 | * | 4/2002 | Prasad | 370/230.1 |
| 6,393,026 B1 | * | 5/2002 | Irwin | 370/401 |
| 2005/0010676 A1 | * | 1/2005 | Venkatachalam et al. | 709/232 |

OTHER PUBLICATIONS

Structured Computer Organization, Andrew S. Tanenbaum, 1984, Prentice-Hall, Inc., 2nd Edition, pp. 10-11.*
Structured Computer Organization, Andrew S. Tanenbaum, 1984, Prentice-Hall, Inc., 2nd Edition, pp. 10-11 (5 pages total).*

* cited by examiner

*Primary Examiner*—Alford Kindred
*Assistant Examiner*—Vincent Lai
(74) *Attorney, Agent, or Firm*—Buckley, Maschoff & Talwalkar LLC

(57) ABSTRACT

According to some embodiments, a processing element includes (i) a next neighbor register to receive information directly from a previous processing element in a series of processing elements, and (ii) a previous neighbor register to receive information directly from a next processing element in the series.

24 Claims, 6 Drawing Sheets

PROCESSING ELEMENT WITH NEXT AND PREVIOUS NEIGHBOR REGISTERS FOR DIRECT DATA TRANSFER

BACKGROUND

A device may include a series of processing elements to process information. For example, a network processor might include a series of microengines to process a packet of information. In some cases, the processing elements may exchange information with each other. For example, information associated with a packet might be passed from one microengine to another microengine another as the packet is processed. Processing elements might also exchange information to coordinate actions (e.g., so that one processing element is aware of another processing element's current state).

DETAILED DESCRIPTION

Figure 1:
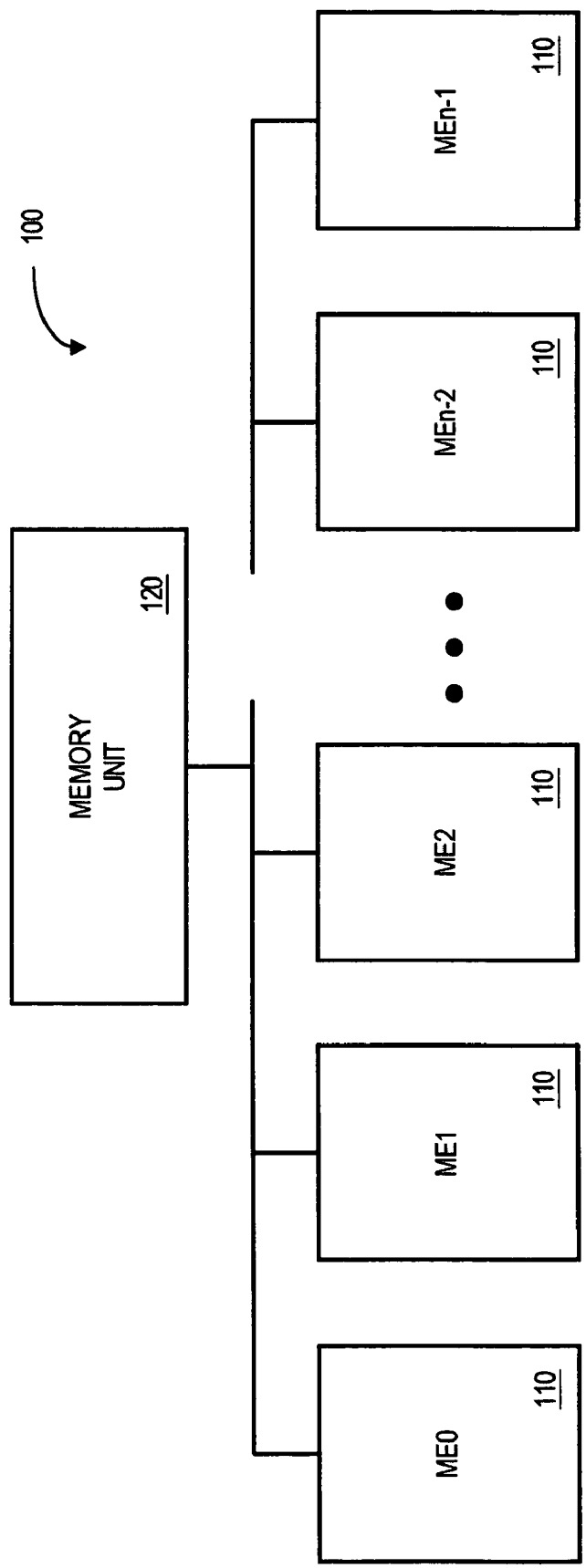
FIG. 1 is a block diagram of a system having a series of processing elements.

FIG. 1 is a block diagram of a system 100 having a series of processing elements 110. In particular, the system 100 includes n microengines: ME0 through MEn−1. The processing elements 110 might comprise, for example, a series of Reduced Instruction Set Computer devices that sequentially process a packet of information. In some cases, the processing elements 110 may need to exchange information. For example, ME1 might provide information associated with a packet to ME2.

To facilitate the exchange of information, each processing element 110 may access a shared, external memory unit 120, such as a Static Random Access Memory (SRAM) unit. For example, ME1 might write information into the memory unit 120. After the information is stored in the memory unit 120, ME2 may read the information from the memory unit 120. In this way, ME1 can provide information to ME2. Note that two operations are required to move the information from ME1 to ME2 (e.g., ME1 writes the information into the memory unit 120 and the ME2 reads the information from the memory unit 120).

For some applications, this way of exchanging information between processing elements 110 might not be practical. For example, the latency associated with the two operations might be unacceptable when packets of information are being processed for a high-speed communication network.

Figure 2:
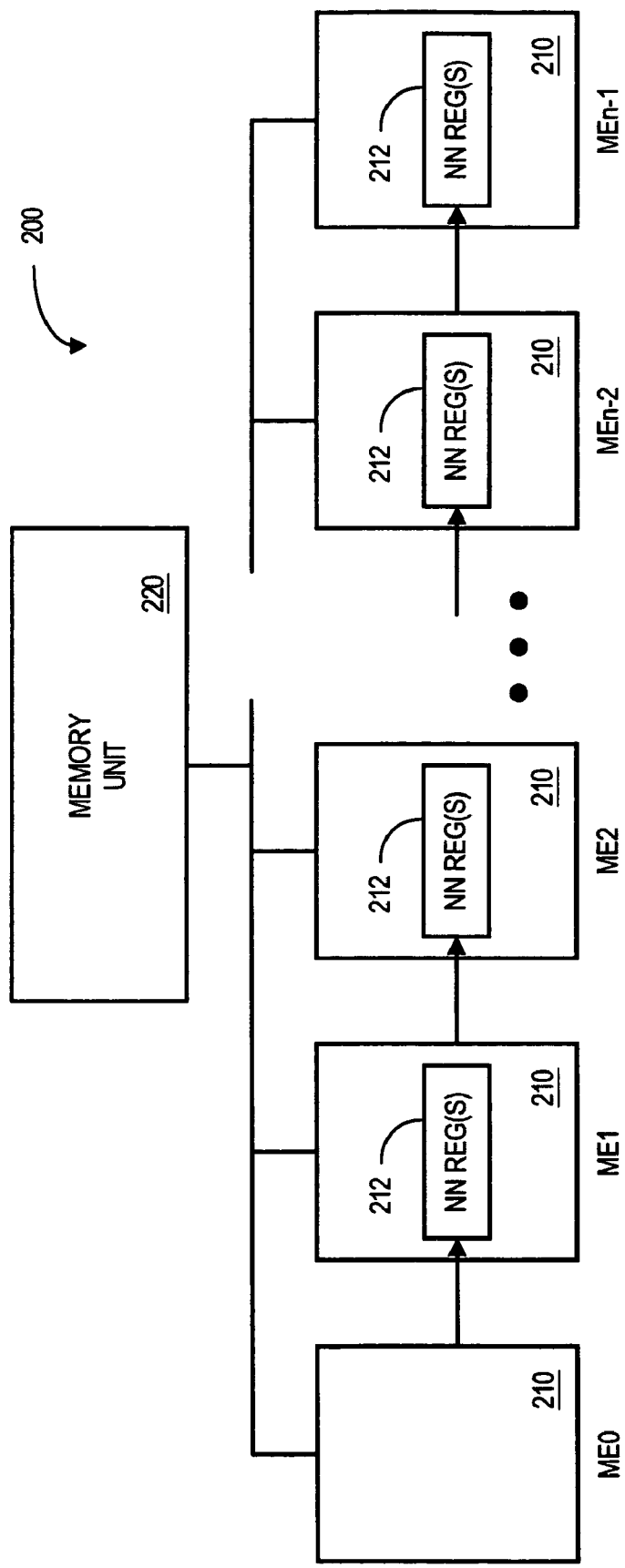
FIG. 2 is a block diagram of a system having processing elements with next neighbor registers.

FIG. 2 is a block diagram of a system 200 with a series of n processing elements 210 (e.g., microengines) and a memory unit 220. In this case, a processing element 210 is able to write information directly to one or more "next neighbor" (NN) registers 212 associated with the next adjacent processing element 210 in the series. For example, ME1 can write information directly to the next neighbor register 212 associated with ME2. Similarly, ME2 can write information directly to the next neighbor register 212 associated with ME3. In this way, a processing element 210 can pass information to the next processing 210 in the series without accessing the memory unit 220.

In some cases, however, a processing element 210 might need to provide information to a previous processing element 210 in the series. For example, ME2 might need to provide ME1 with information about a packet (e.g., indicating whether or not a packet has been transmitted) or about the current state of ME2. Note that the next neighbor registers 212 do not provide a way for a processing element 210 to directly pass information to a previous processing element 210 in the series. For example, if ME2 needs to provide information to ME1, the information would to be stored into (and then read from) the memory unit 220. As before, such an approach might not be practical for some applications (e.g., when processing packets associated with a high-speed communication network).

Figure 3:
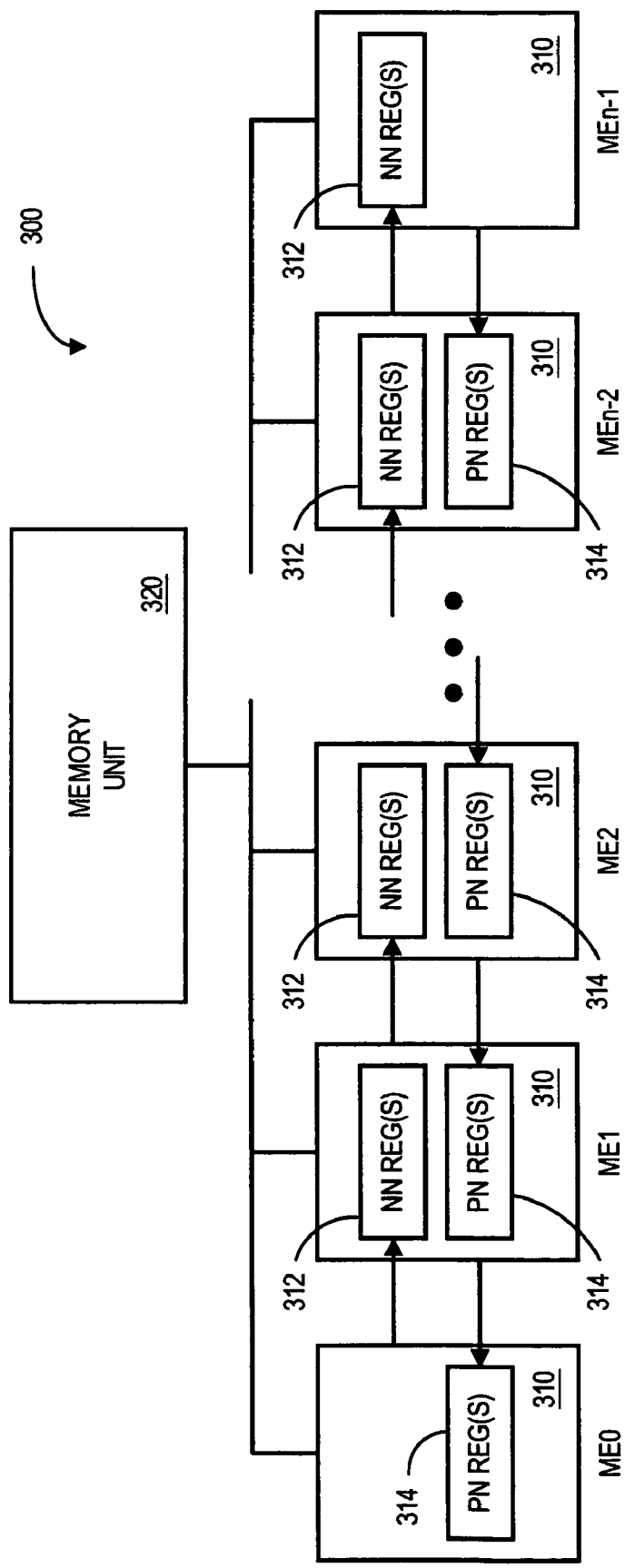
FIG. 3 is a block diagram of a system having processing elements with next and previous neighbor registers according to some embodiments.

FIG. 3 is a block diagram of a system 300 with a series of n processing elements 310 (e.g., microengines) and a memory unit 320 according to some embodiments. As before, a processing element 310 can write information directly to one or more next neighbor (NN) registers 312 associated with the next processing element 310 in the series. In addition, according to this embodiment a processing element 310 can write information directly to one or more "previous neighbor" (PN) registers 314 associated with the previous processing element 310 in the series. For example, ME2 can write information directly to the previous neighbor register 314 associated with ME1. Similarly, ME1 can write information directly to the previous neighbor register 314 associated with ME0. In this way, a processing element 310 can pass information to the previous processing 310 in the series without accessing the memory unit 320.

Figure 4:
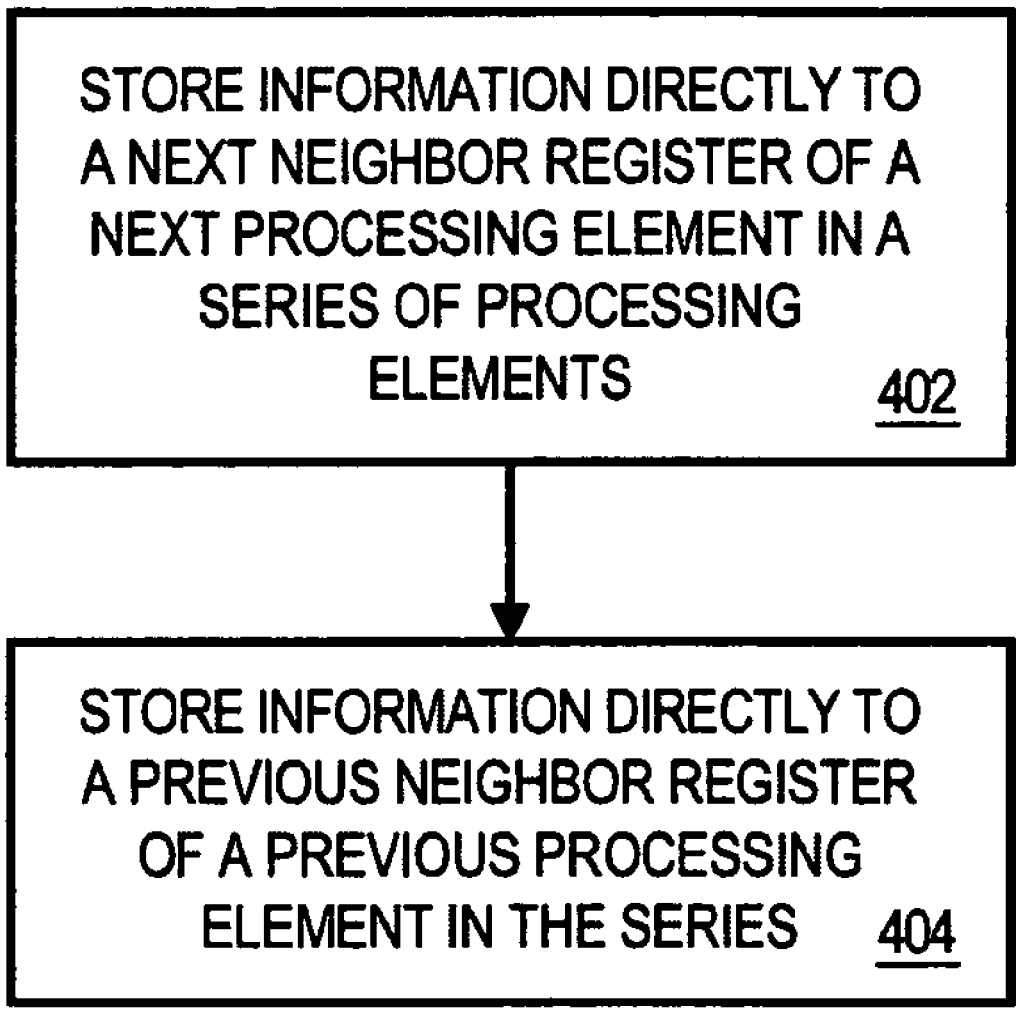
FIG. 4 is a flow chart of a method according to some embodiments.

FIG. 4 is a flow chart of a method according to some embodiments. The method may be performed, for example, by the processing elements 310 described with respect to FIG. 3. The flow charts described herein do not necessarily imply a fixed order to the actions, and embodiments may be performed in any order that is practicable. Note that any of the methods described herein may be performed by hardware, software (including microcode), or a combination of hardware and software. For example, a storage medium may store thereon instructions that when executed by a machine result in performance according to any of the embodiments described herein.

At 402, information is stored directly to a next neighbor register of a next processing element in a series of processing elements. Consider, for example, a series of eight microengines ME0 through M7. In this case, ME3 might directly store information to the next neighbor register of M4. According to some embodiments, MEi may use the next neighbor register of Mi+1 as the destination operand for an Arithmetic Logic Unit (ALU) operation.

At 404, information is stored directly to a previous neighbor register of a previous processing element in the series of processing elements. For example, ME2 might directly store information to the previous neighbor register of M1. According to some embodiments, MEi may use the previous neighbor register of Mi−1 as the destination operand for an ALU operation. Note that there may be a bank of previous neighbor registers, and the registers may be used in indexed mode or as a ring.

In addition to writing information to another element's next and/or previous neighbor register, a processing element may receive information in its own next and/or previous neighbor register. For example, a processing element might receive in its next neighbor register information directly from a previous processing element in the series (e.g., ME3's next neighbor register may receive information directly from ME2). Similarly, a processing element might receive in its previous neighbor register information directly from the next processing element in the series (e.g., ME3's previous neighbor register may receive information directly from ME4). Note that according to some embodiments, a processing element may use its own next and/or previous neighbor register as a source operand for an ALU operation.

Figure 5:
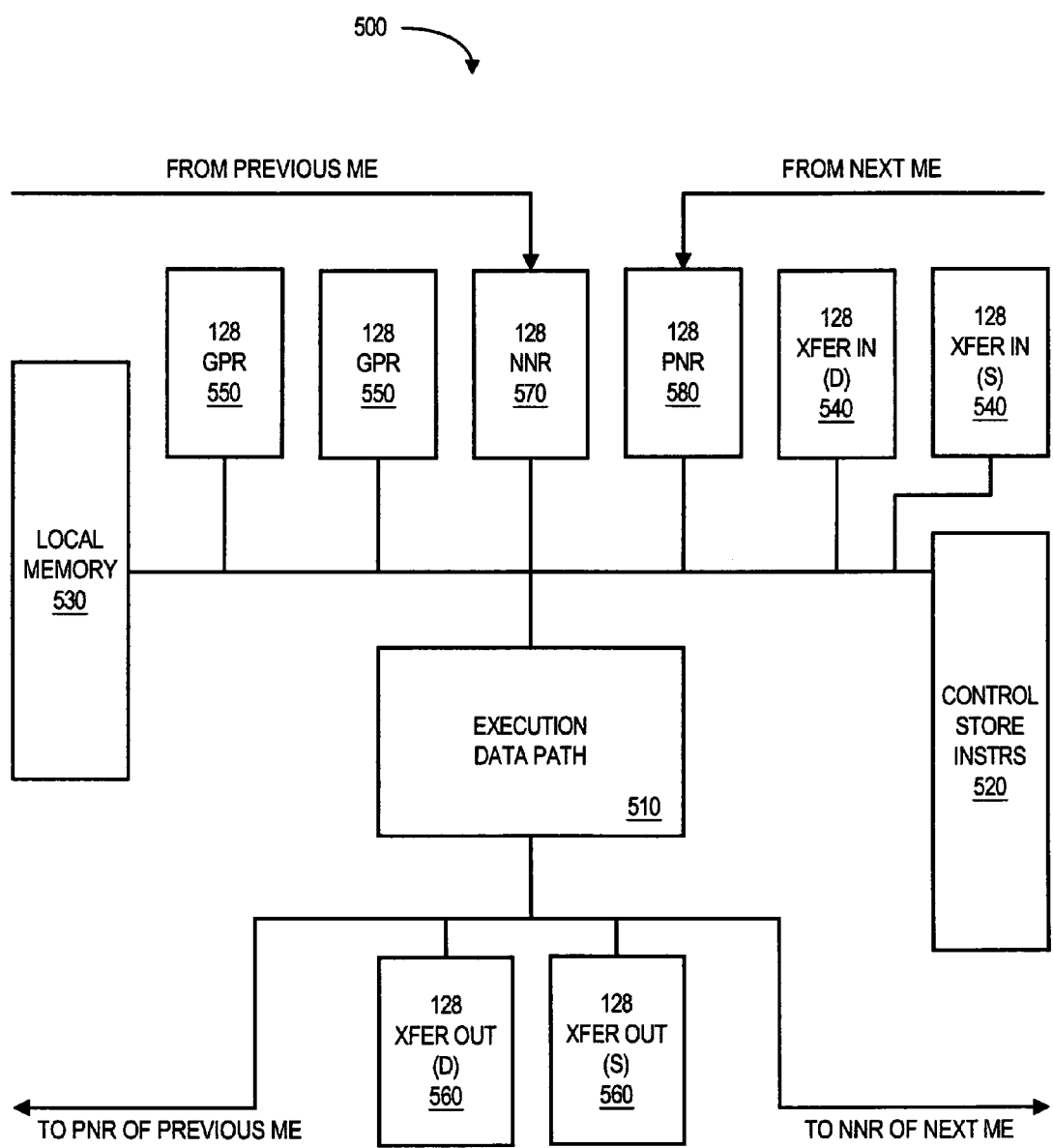
FIG. 5 is a block diagram of a processing element according to some embodiments.

FIG. 5 is a block diagram of a processing element 500 according to some embodiments. In particular, the processing element 500 may perform operations via an execution data path 510 (e.g., a 32-bit RISC execution data path), a control store 520 for instructions (e.g., a control store with 4K instructions), and a local memory 530 (e.g., 640 words of memory). The processing element 500 may also include register banks or files to receive information. For example, a pair of register files 540 (e.g., each having 128 registers) may transfer data in (XFER IN) from a D-push bus and an S-push bus. Similarly, the processing element 500 may include general purpose register (GPR) files 550 to process information and register files to provide data. For example, a pair of register files 560 (e.g., each having 128 registers) may transfer data out (XFER OUT) to a D-pull bus and an S-pull bus.

According to some embodiments, the processing element 500 also includes (i) a next neighbor register (NNR) file 570 having 128 registers that receive information directly from a previous processing element in a series and (ii) a previous neighbor register (PNR) 580 having 128 registers that receive information directly from the a next processing element in the series. Note that the next neighbor register file 570 and/or the previous neighbor register file 580 may be used as an operand for an operation executed by the execution data path 510 (e.g., an A_Operand or a B_Operand).

Information provided by the execution data path 510 may also be provided directly to another processing element (e.g., to a previous neighbor register of a previous processing element and/or a next neighbor register of a next processing element). Although particular elements have been described with respect to FIG. 5, note that the processing element 500 may include other elements in addition to and/or instead of those illustrated (e.g., the processing element 500 might also include a timer or an error checking unit).

Figure 6:
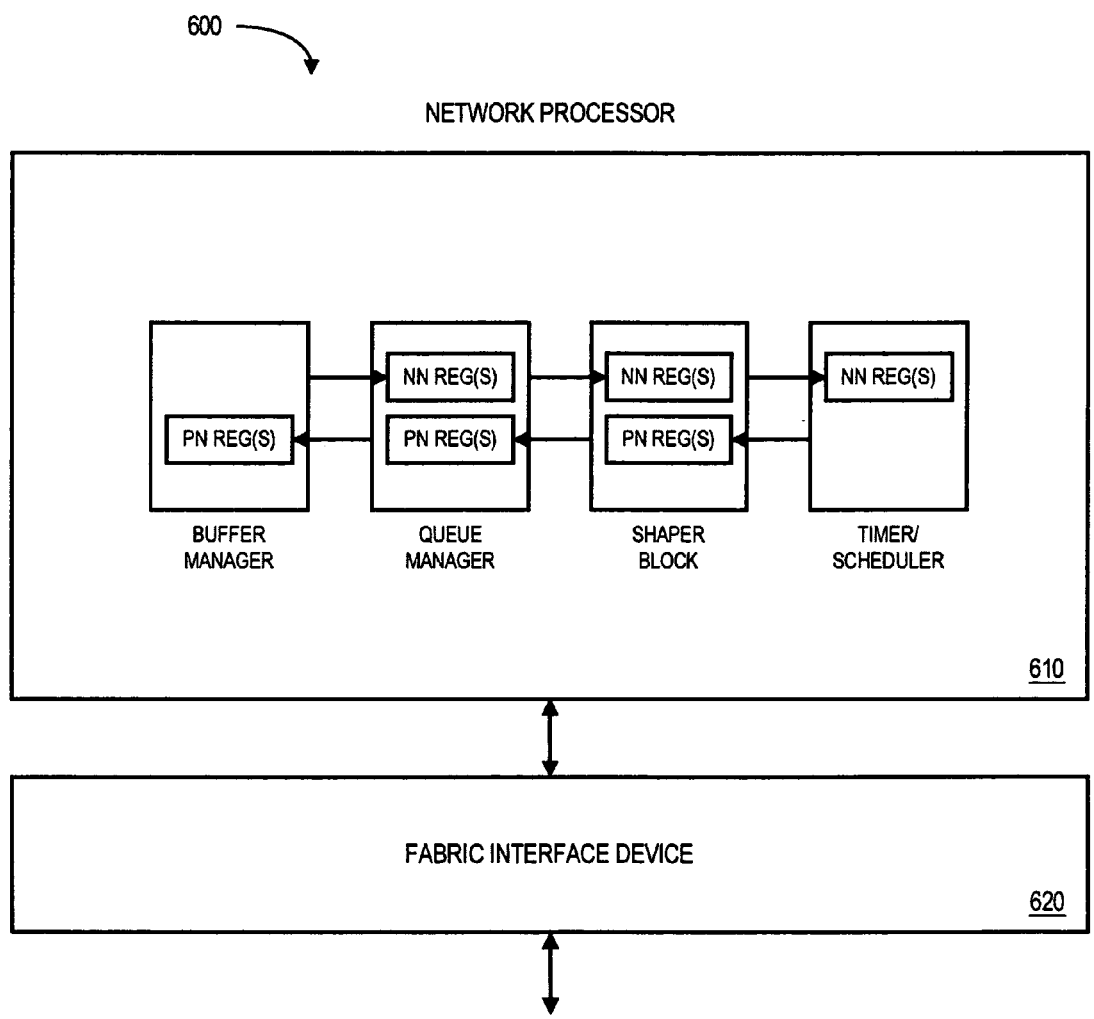
FIG. 6 is an example of a system including a network processor according to some embodiments.

FIG. 6 is an example of a system 600 that includes a network processor 610 according to some embodiments. As used herein, the phrase "network processor" may refer to, for example, a device that facilitates an exchange of information via a network, such as a Local Area Network (LAN), or a Wide Area Network (WAN). By way of example, a network processor might facilitate an exchange of information packets in accordance with the Fast Ethernet LAN transmission standard 802.3-2002® published by the Institute of Electrical and Electronics Engineers (IEEE). Moreover, a network processor may process and/or exchange Asynchronous Transfer Mode (ATM) information in accordance with ATM Forum Technical Committee document number AF-TM-0121.000 entitled "Traffic Management Specification Version 4.1" (March 1999). A network processor may be associated with, for example, a switch, a router (e.g., an edge router), a layer 3 forwarder, and/or protocol conversion. Examples of network processors include those in the INTEL® IXP 2800 family of network processors.

The network processor 610 may include a series of multi-threaded, multi-processing microengines in accordance with any of the embodiments described herein. According to some embodiments, each microengine is associated with a block that performs an ATM traffic management function.

For example, a first microengine may be associated with a buffer manager block that receives ATM information (e.g., from a switch fabric). The buffer manager might also decide whether or not the network processor 610 will accept ATM information.

In accordance with ATM Adaptation Layer 1 (AAL1), the buffer manager may provide individual ATM cells to a queue manager executing on a second microengine. According to other embodiments, the buffer manager provides a frame with multiple ATM cells to the queue manager (e.g., in accordance with AAL5). The queue manager may then enqueue a newly received ATM cell into an appropriate virtual circuit queue.

A shaper block executing on a third microengine may receive a virtual circuit queue identifier from the queue manager and calculate an intended transmission time. For example, the shaper block may retrieve a traffic descriptor associated with the that virtual circuit from an external SRAM unit or from local memory. The traffic descriptor might include a number of parameters (e.g., a peak cell rate and/or a cell delay variation tolerance) and/or a quality of service category associated with that virtual circuit. This information may then be used to calculate an appropriate transmission time.

The shaper block may also provide information to a timer/scheduler executing on a fourth microengine. The timer/scheduler may keep track of the departure times and schedule ATM cell transmissions in accordance with departure times.

According to some embodiments, a microengine associated with the buffer manager, the queue manager, the shaper block, and/or the timer/scheduler can write information directly to a next or previous neighbor register associated with another microengine.

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

Although separate next and previous neighbor register files have been illustrated herein, according to other embodiments one portion of a single register file are next neighbor registers while another portion are previous neighbor registers. Similarly, according to still another embodiment a single register acts as both a next neighbor register and a previous neighbor register. Moreover, although next and previous neighbor registers have been illustrated as being internal to a processing element, according to another embodiment the registers may be implemented outside of a processing element.

In some embodiments described herein, a first processing element in a series does not have (or does not use) a next neighbor register. However, a first processing element might receive in it's next neighbor register information from a last processing element. Consider for example, a series of eight microengines. In this case, ME0's next neighbor register might receive information from ME7. Similarly, a last processing element in a series might receive in it's previous neighbor register information from a first processing element. Consider for example, a series of four microengines. In this case, ME3's previous neighbor register might receive information from ME0.

The several embodiments described herein are solely for the purpose of illustration. Persons skilled in the art will recognize from this description other embodiments may be practiced with modifications and alterations limited only by the claims.

What is claimed is:

1. An apparatus, comprising:
   a dedicated next neighbor register to receive information directly from a previous processing element in a series of processing elements via a destination operand of an arithmetic logic unit operation in the previous processing element; and
   a dedicated previous neighbor register, separate from the next neighbor register, to receive information directly from a next processing element in the series of processing elements via a destination operand an arithmetic logic unit operation in the next processing element.

2. The apparatus of claim 1, wherein the series of processing elements comprises a series of microengines.

3. The apparatus of claim 1, wherein there are a plurality of next neighbor registers and previous neighbor registers.

4. The apparatus of claim 1, wherein the previous neighbor register is a source operand in an arithmetic logic unit operation.

5. The apparatus of claim 1, wherein each processing element comprises a reduced instruction set computer device.

6. The apparatus of claim 1, wherein the series of processing elements is associated with at least one of: (i) asynchronous transfer mode traffic management, (ii) a buffer manager, (iii) a queue manager, (iv) a shaper block, (v) a timer, and (vi) a scheduler.

7. A method, comprising:
   storing information directly to a dedicated next neighbor register of a next processing element in a series of processing elements; and
   storing information directly to a dedicated previous neighbor register of a previous processing element in the series of processing elements by executing an arithmetic logic unit operation having the previous neighbor register as a destination operand.

8. The method of claim 7, further comprising:
   receiving in a next neighbor register information directly from the previous processing element; and
   receiving in a previous neighbor register information directly from the next processing element.

9. The method of claim 8, wherein said receiving information from the next processing element is a result of execution by the next processing element of an arithmetic logic unit operation having the previous neighbor register as a destination operand.

10. The method of claim 7, wherein the series of processing elements comprises a series of microengines.

11. The method of claim 7, wherein there are a plurality of next neighbor registers and previous neighbor registers.

12. The method of claim 7, wherein each processing element comprises a reduced instruction set computer device.

13. The method of claim 7, wherein the series of processing elements is associated with at least one of: (i) asynchronous transfer mode traffic management, (ii) a buffer manager, (iii) a queue manager, (iv) a shaper block, (v) a timer, and (vi) a scheduler.

14. An article, comprising:
    a storage medium having stored thereon instructions that when executed by a machine result in the following:
    storing information directly to a dedicated next neighbor register of a next processing element in a series of processing elements, and
    storing information directly to a dedicated previous neighbor register of a previous processing element in the series of processing elements by executing an arithmetic logic unit operation having the previous neighbor register as a destination operand, wherein the series of processing elements is associated with a multi-core network processor.

15. The article of claim 14, wherein execution of the instructions further results in:
    receiving in a dedicated next neighbor register information directly from the previous processing element, and
    receiving in a dedicated previous neighbor register, separate from the next neighbor register, information directly from the next processing element.

16. The article of claim 15, wherein said receiving information from the next processing element is a result of execution by the next processing element of an arithmetic logic unit operation having the previous neighbor register as a destination operand.

17. The article of claim 14, wherein the series of processing elements comprises a series of microengines.

18. The article of claim 14, wherein there are a plurality of next neighbor registers and previous neighbor registers.

19. The article of claim 14, wherein each processing element comprises a reduced instruction set computer device.

20. The article of claim 14, wherein the series of processing elements is associated with at least one of: (i) asynchronous transfer mode traffic management, (ii) a buffer manager, (iii) a queue manager, (iv) a shaper block, (v) a timer, and (vi) a scheduler.

21. A network processor, comprising:
    a first microengine in a series of microengines;
    a third microengine in the series; and
    a second microengine in the series, including:
      a dedicated next neighbor register to receive information directly from the first microengine via a destination operand of an arithmetic logic unit operation in the first microengine; and
      a dedicated previous neighbor register, separate from the next neighbor register to receive information directly from the third microengine via a destination operand of an arithmetic logic unit operation in the third microengine.

22. The network processor of claim 21, wherein each microengine comprises a reduced instruction set computer device.

23. A system, comprising:
    a multi-core processor including a series of processing elements and further including in at least one of the processing elements:
      a dedicated next neighbor register to receive information directly from a previous processing element in the series of processing elements via a destination operand of an arithmetic logic unit operation in the previous processing element, and a dedicated previous neighbor register to receive information directly from a next processing element in the series of processing elements via a destination operand of an arithmetic logic unit operation in the next processing element; and an asynchronous transfer mode fabric interface device coupled to the network processor.

24. The system of claim 23, further comprising:

a static random access memory unit external to and shared by the processing elements.

* * * * *